Figure 1:
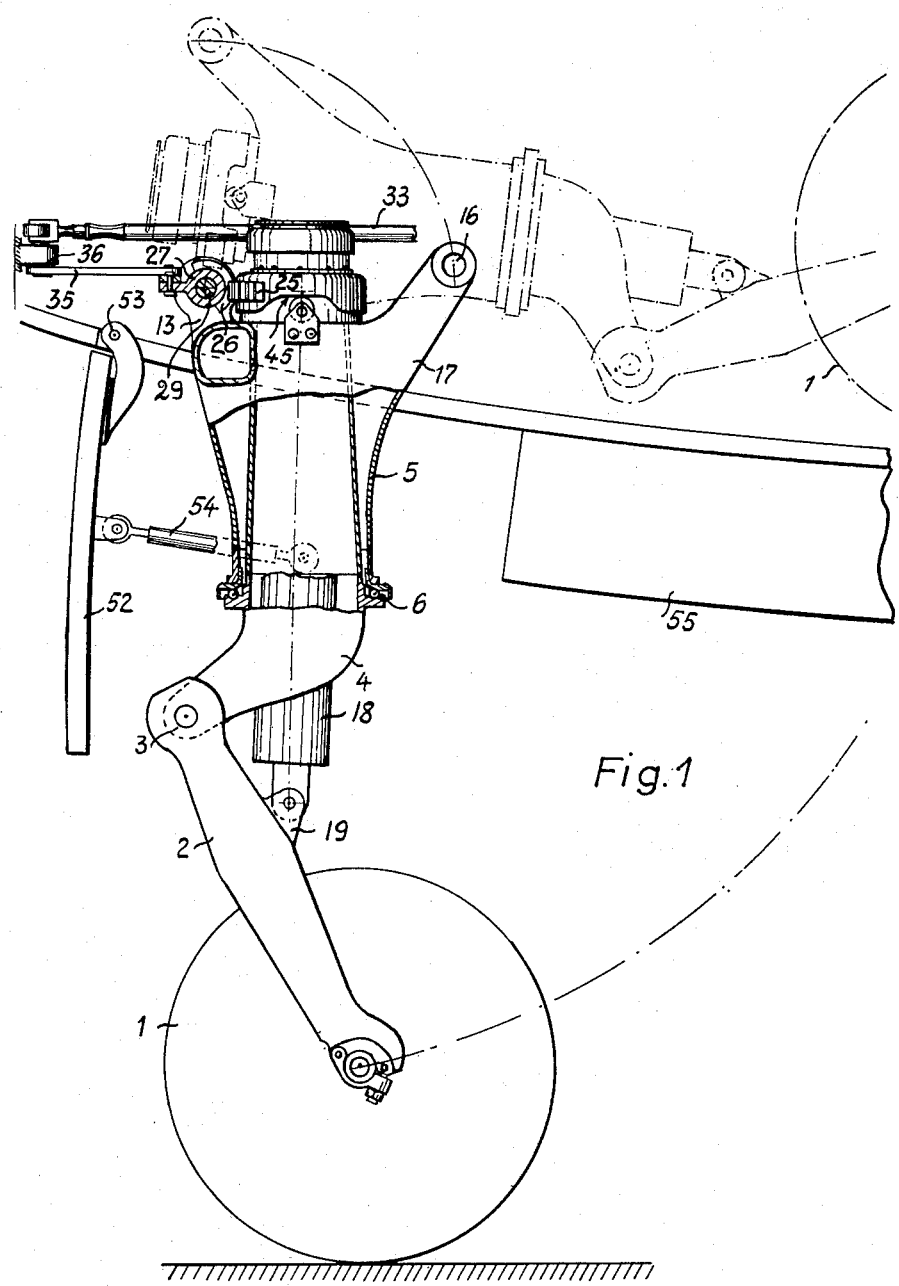

May 29, 1956  R. SAULNIER  2,747,817
RETRACTABLE LANDING GEARS
Filed Aug. 5, 1954  3 Sheets-Sheet 3

Inventor:
Raymond Saulnier
By Brown & Seward
Attorneys

United States Patent Office 2,747,817
Patented May 29, 1956

2,747,817

RETRACTABLE LANDING GEARS

Raymond Saulnier, Paris, France

Application August 5, 1954, Serial No. 447,972

Claims priority, application France August 11, 1953

2 Claims. (Cl. 244—50)

The present invention relates to retractable landing gears for aircraft of the type in which the wheel is carried by a strut pivotally mounted on the aircraft structure, means being provided to rotate said strut around its axis, whereby the wheel can be steered when the aircraft is rolling on the ground.

Such steerable wheels are in particular used on aircraft equipped with so-called tricycle landing gears.

The main difficulty in manufacturing a landing gear of this type is to ensure the proper steering transmission without interfering with the retraction and vice-versa.

Devices have already be proposed in which the steering transmission is established between the steering control means and the strut on which the wheel is mounted only when said strut is brought into the landing position, while in the retracting and retracted positions of the strut the transmission is disconnected.

However, it has been difficult to obtain complete security in establishing in a simple and economical way the necessary non-permanent connections.

The present invention has for its main object to provide a retractable landing gear carrying an orientable wheel in which a permanent steering transmission is established in a reliable way between the steering control means and the strut without interfering with the pivotal displacement of the strut in retraction and extension.

Another object of the invention is to provide steering transmission means capable of being automatically disengaged and re-established when the landing wheel is in contact with the ground.

A further object of the invention is to provide a retractable landing gear comprising a strut, a strut supporting member pivotally mounted around a first axis on a shaft carried by the aircraft structure, a wheel carried by said strut, said strut being rotatively mounted in said supporting member around a second axis orthogonal to said first axis, a pinion keyed on the upper part of said strut, a tubular rack slidably mounted on said shaft, the planes of symmetry of the teeth of said rack being disposed perpendicularly to the axis of said shaft, said teeth extending along an arc of circumference at least equal to the angular displacement of said strut for retracting the gear and means to steer said wheel by axially displacing said rack, said pinion thus meshing with said rack whatever the angular position of said strut.

A still further object of the invention is to provide a retractable landing gear of the type specified comprising cam means to axially displace said pinion, automatically, when the ground reactions on the wheel tend to rotate the same over the required steering angle.

Other objects and advantages of the invention will be better apparent from the detailed description, together with the accompanying drawings submitted for purposes of illustration only and not intended to define the scope of the invention, reference being had for that purpose to the subjoined claims.

Figure 2:
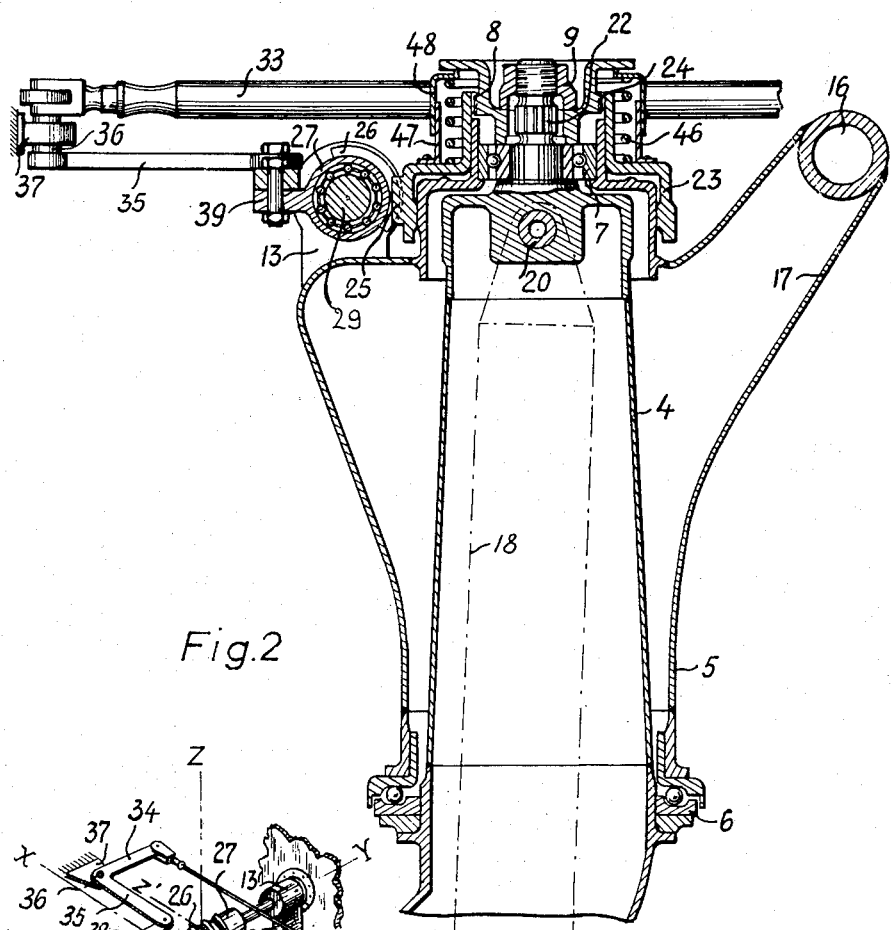
Figure 5:
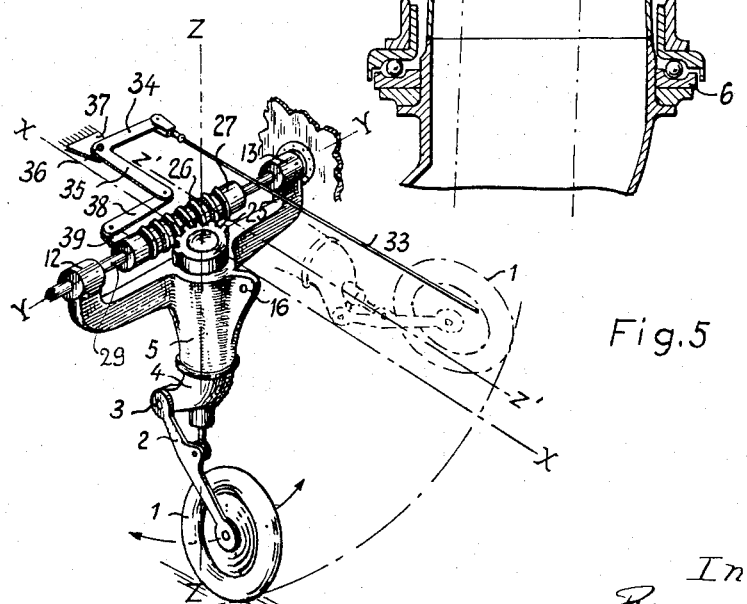
Figure 3:
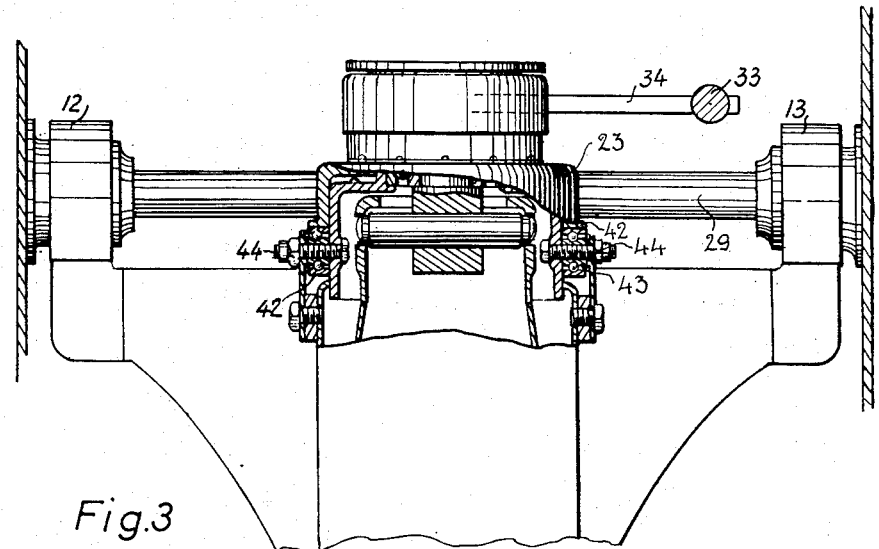
Figure 4:
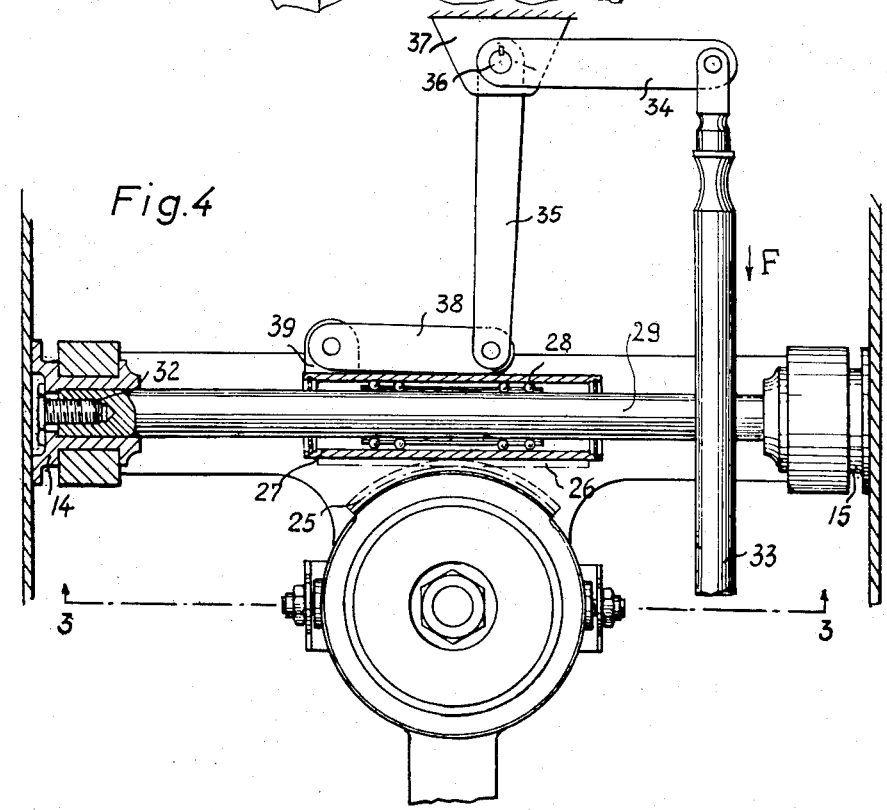

In the drawings:

Fig. 1 shows, in side elevation, partly in section, a landing gear according to the invention, Fig. 2 is an axial cross section of a part of said gear, on a larger scale, Fig. 3 is an elevation, partly in section, of the upper part of the landing gear, Fig. 4 is a plan view corresponding to Fig. 3, and, Fig. 5 is a perspective, somewhat schematic, view of the landing gear.

Referring to the drawings, there is shown at 1 an orientable wheel of a retractable landing gear, said wheel being mounted on the extremity of an arm 2, the other extremity of which is pivoted about an axle 3 carried by the lower extremity of a strut 4. Said strut is rotatively mounted in a supporting member 5 through a thrust ball bearing 6 and another ball bearing 7.

The inner race of the bearing 7 is held in place on the extremity of strut 4 by means of an annular member 8 secured by a nut 9 on the threaded upper extremity of the strut 4.

The supporting member 5 is pivoted through sockets 12 and 13 on pivots 14 and 15 carried by the aircraft structure. The pivoting of said supporting member 5 permits bringing the strut 4 either into the landing position shown in Figs. 1 and 5 or into the retracted position shown in dot-and-dash lines on the same figures.

It must be understood that the retracting displacement can be obtained in any conventional way, for instance by a jack one extremity of which is connected to the aircraft structure, while the other is pivoted to an arm 17 rigid with the supporting member 5 and provided at its end with an opening 16.

The wheel 1 is elastically supported by the strut 4 through a shock absorber 18 one extremity of which is pivoted on an extension 19 of the arm 2 while the other is pivoted on an axle 20 carried by the upper part of the strut 4.

The steering of the wheel 1 is obtained by the rotation of the strut 4 around its axis. It is ensured by a device comprising the annular member 8 which is provided with inner teeth meshing with a pinion 22 carried by the upper part of the strut 4 and a sleeve member 23, provided with inner teeth 24 meshing with corresponding teeth formed on the outer surface of the member 8 and comprising furthermore spur gear teeth 25 forming a toothed section meshing with a cylindrical rack 26. Said cylindrical rack 26 is formed on a tubular element 27 slidably mounted, for example through balls 28, on a shaft 29 the extremities of which are fixedly mounted in the pivotal supports 14 and 15 through screws 32.

The axial displacements of the tubular element 27 steer the wheel 1 are ensured by a control rod 33 through a lever 34—35, keyed on a pivot 36 rotatably mounted in a supporting member 37 carried by the aircraft structure. The extremity of the arm 35 of said lever is connected, through a link 38, to a radial extension 39 of the tubular element 27. Now, to obtain automatic disengagement of the steering transmission when the wheel is urged by ground reactions to rotate beyond the angle required for steering purposes, e. g., when the aircraft is towed or rolls on an uneven ground, the sleeve member 23 is axially displaceable under the action of resilient and cam means. In a preferred embodiment the annular element 23 is urged by a spring 46 against two rollers, constituted by the outer races 42 of two ball-bearings, the inner races 43 of which are rigidly secured by bolts 44 to brackets mounted on the upper part of the supporting member 5. The sleeve member 23 is provided with a cam surface 45 extending along an arc corresponding to the permitted controlled orientation of the wheel strut 4.

When the angular displacement of the sleeve member 23 exceeds this arc, said member 23 is axially displaced by the cam-follower rollers acting on the cam 45. This axial displacement of the annular member 23 brings the teeth 24 out of mesh with the corresponding teeth of the annular member 8 so that the steering transmission is automatically disengaged. The mechanism above described is protected against penetration of dust, and the like by means of two telescopic members 47 and 48.

It must be understood that any conventional means may be provided between rack 26 and the steering control means to disengage the steering connection at will.

It will be understood that the teeth of rack 26 do not necessarily extend along a complete circumference. The minimum angle along which the teeth must extend is about 90 degrees, corresponding to the angular displacement of the strut. However, to increase the mechanical resistance of the teeth, permitting them to transmit the necessary forces for steering, said teeth are preferably extended beyond the 90 degrees above mentioned. In Fig. 2, these teeth extend substantially along one half of a circumference.

To close completely the opening in which the landing gear is retracted, there are three panels, viz., a panel 52 pivoted about an axis 53 perpendicular to the vertical plane of symmetry of the airplane and connected by a link 54 to the supporting member 5 and two other panels 55, one of which is visible in Fig. 1, said panels being pivoted about horizontal axes, not shown, in a plane parallel to the vertical plane of symmetry of the airplane.

The operation of the landing gear according to the invention is as follows:

When the strut 4 is brought to its landing position, as shown in full lines on the drawings, the axis of orientation of the wheel 1 is substantially vertical. To steer the airplane on the ground by orienting the wheel 1, the pilot operates the control rod 33. Said rod can, for instance, be connected to a rudder-bar when the landing gear is lowered, this connection being established directly or through a servo-mechanism.

If the rod 33 is displaced in the direction of the arrow F of Fig. 4, the lever 34—35 is rotated about its axis 36 clockwise, so that the rack 26 is displaced from the right to the left as seen in Fig. 4, while the displacement of the rod 33 in the opposite direction causes a displacement of the rack 26 in the opposite direction. The pinion 25, constantly in mesh with the teeth of the rack 26, is thus rotated in the corresponding direction, such rotation being transmitted to the sleeve member 23 and annular member 8 and thus to the strut 4 carrying the wheel 1.

When the landing gear is retracted, the pinion 25 revolves around the axis of the cylindrical rack 26 meshing with the same in every angular position of the strut 4. Due to the fact that the teeth 26 have their planes of symmetry perpendicular to the axis of the shaft 29, the pivoting of the strut 4 does not cause any rotation of the strut with respect to the supporting member 5.

It is clear from this description, that the landing gear according to the invention ensures perfect security due to its simplicity and to the permanent meshing of the teeth of the pinion, as well in the landing as in the retracted position of the strut 4.

The panels 52 and 55 are automatically operated in the usual way, the panel 52 through the link 54 connected to the landing gear and the panels 55 by any conventional device.

What is claimed is:

1. A retractable landing gear for aircraft comprising, a tubular strut supporting member pivotally mounted on a shaft carried by the aircraft and a wheel carrying strut rotatably mounted within said supporting member, an externally toothed sleeve member carried by said supporting member to rotate relative thereto and to be moved lengthwise thereof between operative and inoperative positions, a tubular rack-bar slidably mounted on said shaft and retained thereby in meshing relation with the external teeth of said sleeve member, the planes of symmetry of the teeth of said rack-bar being perpendicular to the axis of said shaft and the end faces of said rack-bar teeth extending along a circular arc corresponding to the angular displacements of said strut between retracted and extended positions thereof so that said meshing relation is maintained whatever the angular position of the strut between said retracted and extended positions, a releasable drive connection between said sleeve member and said strut to rotate the strut with said sleeve member in the operative position thereof, said drive connection being releasable upon movement of said sleeve member towards its inoperative position, resilient means to urge said sleeve member towards said operative position and camming means on said sleeve member and said supporting member arranged to move said sleeve member into said inoperative position against the action of said resilient means, said camming means being effective upon rotation of said sleeve member beyond a predetermined range of angular movement thereof, and steering means connected to said rack-bar to move the same along said shaft so as to rotate said strut about its own axis, the arrangement being such that said strut may be rotated by said steering means only within said predetermined range of angular movement of the sleeve member.

2. A retractable aircraft landing gear according to claim 1, in which said drive connection comprises an annular member rotatably mounted between said strut and said sleeve member, said annular member being formed with inner teeth meshing with a pinion carried by said strut, and formed with lengthwise extending outer teeth adapted to engage lengthwise extending inner teeth provided on said sleeve member, the length of said outer teeth of the annular member and the length of said inner teeth of the sleeve member being such that said lengthwise extending teeth are disengaged when said sleeve member is moved into said inoperative position.

References Cited in the file of this patent

UNITED STATES PATENTS

| | | |
|---|---|---|
| 2,213,967 | Roche | Sept. 10, 1940 |
| 2,254,935 | Darling | Sept. 2, 1941 |
| 2,613,888 | Stratford | Oct. 14, 1952 |

FOREIGN PATENTS

| | | |
|---|---|---|
| 576,641 | Great Britain | Apr. 12, 1946 |
| 709,557 | Germany | Aug. 20, 1941 |
| 893,622 | France | Feb. 14, 1944 |